(12) United States Patent
Dias

(10) Patent No.: US 11,465,039 B2
(45) Date of Patent: Oct. 11, 2022

(54) METHOD AND SYSTEM FOR MOBILE DEVICE USERS TO ENGAGE IN MULTIPLE PROMOTIONAL CAMPAIGNS BY SINGLE REGISTRATION

(71) Applicant: Neshan Dias, Wahroonga (AU)

(72) Inventor: Neshan Dias, Wahroonga (AU)

(73) Assignee: Neeshan Dias, Wahroonga (AU)

( * ) Notice: Subject to any disclaimer, the term of this patent is extended or adjusted under 35 U.S.C. 154(b) by 14 days.

(21) Appl. No.: 16/710,501

(22) Filed: Dec. 11, 2019

(65) Prior Publication Data

US 2020/0193466 A1    Jun. 18, 2020

(30) Foreign Application Priority Data

Dec. 17, 2018 (AU) ................. 2018904782

(51) Int. Cl.
*A63F 9/24* (2006.01)
*G06Q 30/02* (2012.01)
*A63F 3/06* (2006.01)
*G07F 17/32* (2006.01)

(52) U.S. Cl.
CPC .............. *A63F 9/24* (2013.01); *A63F 3/0645* (2013.01); *G06Q 30/0209* (2013.01); *G06Q 30/0267* (2013.01); *G07F 17/329* (2013.01); *G07F 17/3251* (2013.01); *G07F 17/3255* (2013.01)

(58) Field of Classification Search
None
See application file for complete search history.

(56) References Cited

U.S. PATENT DOCUMENTS

| | | | |
|---|---|---|---|
| 2004/0193489 A1* | 9/2004 | Boyd | G06Q 30/0225 713/176 |
| 2009/0287570 A1* | 11/2009 | Adamousky | G06Q 30/0601 705/14.54 |
| 2011/0086712 A1* | 4/2011 | Cargill | A63F 13/79 463/42 |
| 2013/0339112 A1* | 12/2013 | Palexas | G06Q 30/0209 705/14.12 |
| 2019/0022530 A1* | 1/2019 | Kornmann | A63F 13/65 |

* cited by examiner

*Primary Examiner* — Jason T Yen
(74) *Attorney, Agent, or Firm* — Gable Gotwals

(57) ABSTRACT

A device for engaging users in an advertisement and promotions campaign and a method and system for mobile device users to engage in multiple promotional campaigns by a single registration.

10 Claims, 18 Drawing Sheets

Choose package or customise
| | ① | ② | ③ | ④ |
|---|---|---|---|---|
| Campaign: |  |  |  |  |
| Reach (*people): | | | | |
| Prizes ($ x Qty): | | | | |
| Main | | | | |
| Instant | | | | |
| Advertising: | | | | |
| *Clicks | | | | |
| *Views | | | | |
Prices are ex-gst
*Capped at, not a guarantee
Fig. 14

METHOD AND SYSTEM FOR MOBILE DEVICE USERS TO ENGAGE IN MULTIPLE PROMOTIONAL CAMPAIGNS BY SINGLE REGISTRATION

CROSS-REFERENCE TO RELATED APPLICATIONS

This United States application claims priority to Australian Patent Application No. 2018904782 filed 17 Dec. 2018 which is incorporated herein by reference.

The present invention relates to a device for engaging users in an advertisement and promotions campaign. More particularly the present invention relates to a method and system for mobile device users to engage in multiple promotional campaigns by a single registration.

BACKGROUND

Advertising and promotion is a complex process business. There are all kinds of different advertisement and promotion campaigns all around and it is difficult to keep the consumer interested and engaged in an advertisement and promotion for a substantial period of time.

For instance, a person skilled in the art would understand that marketing promotions are cumbersome and expensive for businesses (merchants) today for the following reasons:

1. Running a promotion, especially one that offer prizes to attract consumers, requires considerable logistics to reach and enroll consumers, long lead times (10-20 weeks) and costs between $30,000 and $2,000,000, or even more. The high cost for running a promotion restricts a promotion to a select group of customers adds significant complexity.

2. Consumers, meanwhile, find it unrewarding and cumbersome to sign up each time.

3. Most of the current promotional spend is on advertising which is generally expensive and a negative experience for consumers because it interrupts, demands attention, asks for something (spend or act) for a future potential benefit.

4. Success of a promotion is not always clear or easily measurable and usually requires analysis after the completion of the campaign. Applying the learning requires repeating an expensive and time-consuming process.

5. There is considerable competition on existing traditional platforms making it difficult to be heard or seen via existing alternatives.

Providing a gaming experience can challenge a consumer and providing brand-related games and awards can maintain a consumer's interest and immerse the consumer in an advertisement and promotion campaign. However, there is a lack of a centralised platform for a user to engage or immerse in different advertisements and promotions campaigns.

US Patent Published No. 8762197 discloses a platform for consumers by providing games and social networks to engage consumers during game play and during interstitial periods between game level transitions to promote loyalty to games with rewards. The platform provides advertisements of brands or local service providers. Consumers can invite friends to a platform and social networks for social game challenge across heterogeneous games. Brands, location based service providers, and game developers can conduct and track campaigns using an optimized points conversion engine and offer recommendation engine of the platform. Software code embedded in the games conducts campaigns during game play and interstitial times during game level transitions to convert game points earned into platform points that can be exchanged by garners to redeem rewards in-game or later. There is no detail on how the game can be conducted and there is no provision of a platform for multiple sponsors to run different campaigns.

US Patent Application No. 20060085261 discloses an online game advertising system that provides an architecture for brand promotion enabling the definition, sales, distribution, and management of interactive advertisements, sponsorships, and placements. The brand promotion will appear within an online video game as part of the game experience or during idle load, wait, and pause screens. For example, in a race car game, when a driver pulls in for a pit stop, the engine oil brand that the game player may choose may be defined as locations for advertisements or product placements for real life engine oils and game publishers and advertisers may manage what specific advertisements to place in these locations. Similar, there is no detail on how the game can be conducted and there is no provision of a platform for multiple sponsors to run different campaigns.

US Patent Application No. 6578735 discloses a method of promoting a product or a brand in a retail store, or of promoting customer loyalty by engaging a customer to a prize/bonus ticket game. The prize/bonus ticket game will be activated based on the information from analysing data of a customer at a point of sale relating to: purchase of a particular product or brand, or total amount spent equalling or exceeding a predetermined value. If this is the case, the customer is directed to participate in a prize/bonus ticket game configured as a game of chance, conducting a game of chance based on a predetermined win table having a specified number of predetermined winning numbers each associated with a bonus or prize and a further number of no win stops, i.e. numbers which are not winning numbers, and in the case of a win, issuing to the customer a ticket which is a winning ticket associated with the product or product range. The method also includes operating a gaming machine and promoting Internet shopping, as well as a ticket dispenser. Again, there is no detail on how the game can be conducted and there is no provision of a platform for multiple sponsors to run different campaigns.

A significant opportunity awaits a solution that makes promotions easy, rewarding, measurable and affordable to any company while also making it a positive experience for their target audience.

Therefore, it currently lacks a platform that can provide multiple sponsors to conduct brand-related sponsorship campaigns. There is a significant demand awaiting a solution that makes promotions easy, rewarding, measurable and affordable to any company while also making it a positive experience for their target audience.

SUMMARY

It is an object for the present invention to provide a device for engaging users in a marketing campaign.

It is another object for the present invention to provide a consumer a digital device for engaging users with multiple brand-related engagements.

Another object of the present invention relates to a method and system for mobile device users to engage in multiple sponsorship campaigns by a single registration.

It is another object of the present invention to provide an improvement of a method and system for mobile device users to engage in multiple sponsorship campaigns by a single registration.

It is, therefore, an object of the present invention to provide a consumer digital device for engaging users with multiple brand-related engagements.

Other objectives and advantages will become apparent when taken into consideration with the following specification and drawings.

It is also an object of the present invention to overcome or ameliorate at least one of the disadvantages of the prior art, or to provide a useful alternative.

In one aspect of the present invention, there is provided a multiple campaigns system to provide a number of engagements to a user to obtain an award from a sponsor, comprising:

a multiple campaigns engine is adapted to carrying out a game sponsored method, a phrase engine adapted to carrying out a tracking method of tracking the phrase location, a game engine adapted to carrying out a game piece collection method to solve a secured game prize key with the game piece obtained by the game engine, a rewards engine adapted to carrying out a prize determination method for determining winners and a prize of a game administrated by the game engine, and a coin engine adapted to carrying out multiple campaigns and designed for managing multiple campaigns in response to a notification from the rewards engine.

Preferably, the game is triggered by a code received by a consumer digital device, and the consumer device is adapted to request a game by sending the code to a game server.

Preferably, the consumer digital device may send a request to obtain a game piece randomly between 2-5 tries.

Preferably, the phrase tracking method comprises steps of: checking the user phrase location; requesting the next set of phrases; incrementing the user phrase location; and serving the next set of phrases.

Preferably, the game sponsored method comprises the steps of: checking for a game piece; identifying a particular game and determining which piece(s) to supply.

Preferably, the consumer digital device is adapted to display the selection interface to allow a user to select which sponsor campaign to engage in.

Preferably, the selection interface is adapted to request the multiple campaigns engine to determine whether a game piece is available once the user makes a selection on the selection interface.

Preferably, the consumer digital device is adapted to receive game piece in the event that a game piece is available, or else to select another game, or try again later when more pieces or games become available.

Preferably, the game server is adapted to issue a new game piece in response to a game piece request from the consumer digital device.

Preferably, the game pieces collection method comprises the steps of: incrementing a memory register for a prize, and blocking the game piece from being issued again to the same user.

Preferably, the game engine 106 is adapted to carrying out the steps of: sending a notification of the game piece played, or sending a notification of the game completed.

Preferably, prize determination method comprises the steps of checking if a prize is won, and end the process if a prize is not won or issue a prize notification to a user if a prize is won.

Preferably, the multiple campaigns management method comprises the steps of: receiving a notification of winning a prize, issuing a reward, updating the account of the user with the reward; and updating a registry of the sponsor.

BRIEF DESCRIPTION OF THE FIGURES

Features and advantages of the present invention will become apparent from the following description of embodiments thereof, by way of example only, with reference to the accompanying drawings, in which:

FIG. 14 shows a campaign statistics interface of the method of FIG. 2; and

DESCRIPTION OF THE INVENTION

Reference is now made to FIG. 1 to FIG. 15 showing a preferred embodiment of the present invention.

Figure 1:
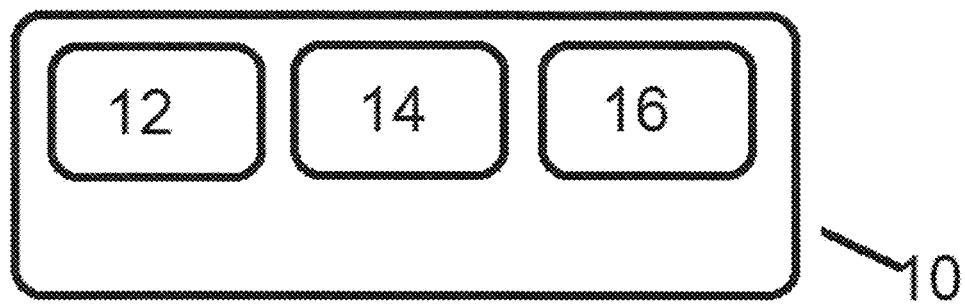
FIG. 1 shows a schematic diagram of a consumer digital device according to an embodiment of the present invention.
Figure 2A:
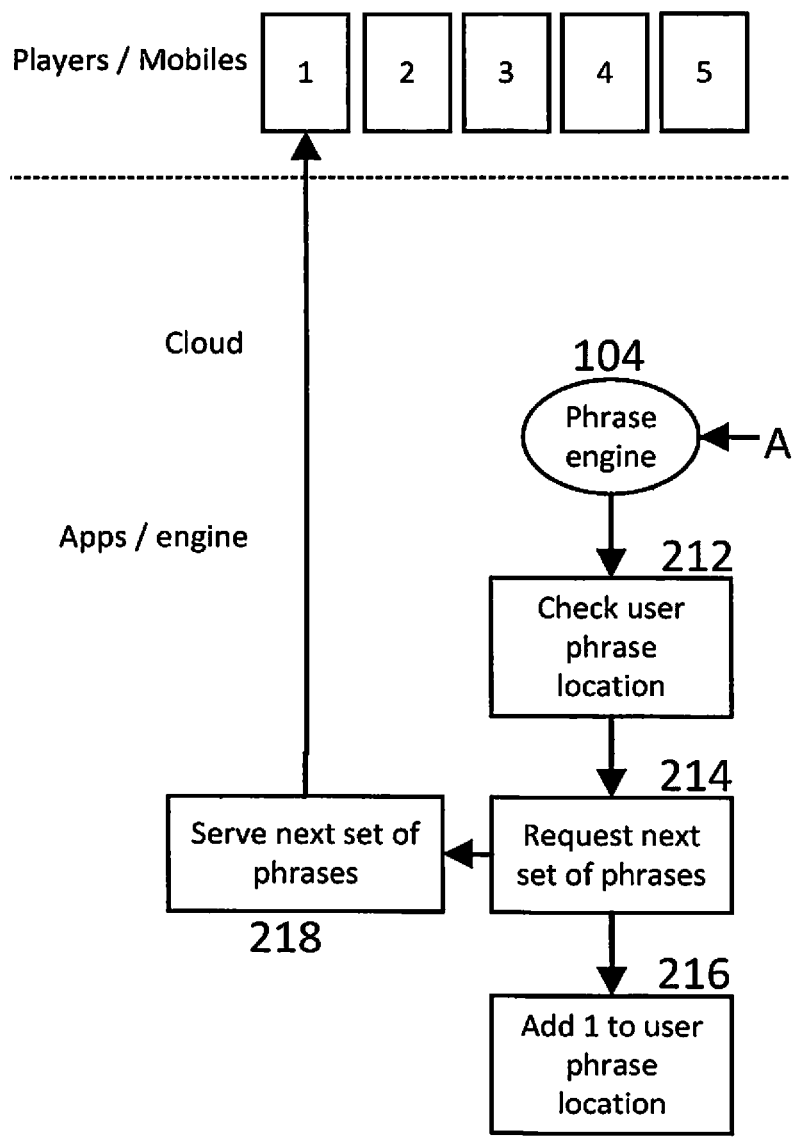
FIG. 2A-D show a flowchart of a method to be carried out by a multiple currency advertisement and promotion system according to an embodiment of the present invention.
Figure 2B:
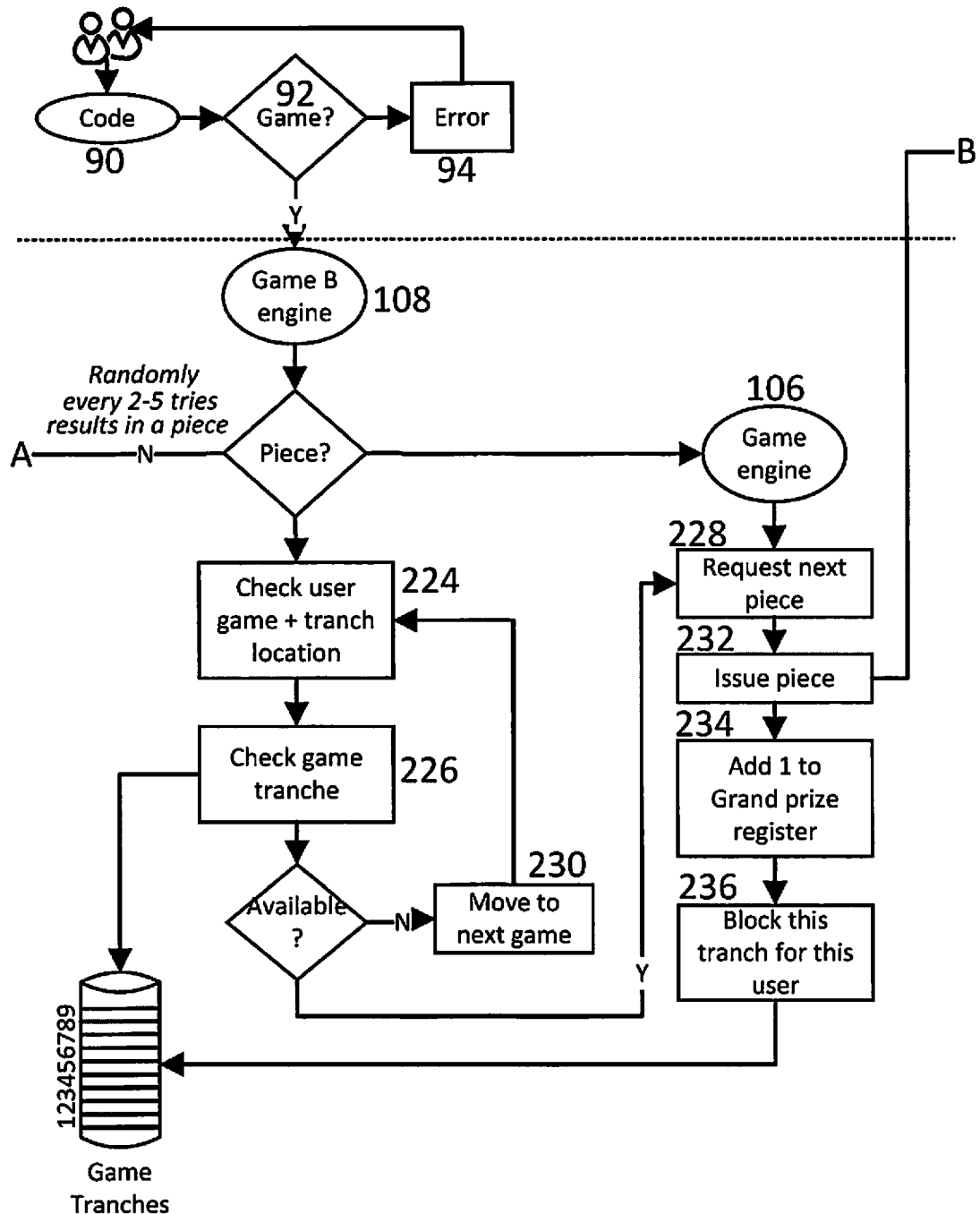
Figure 2C:
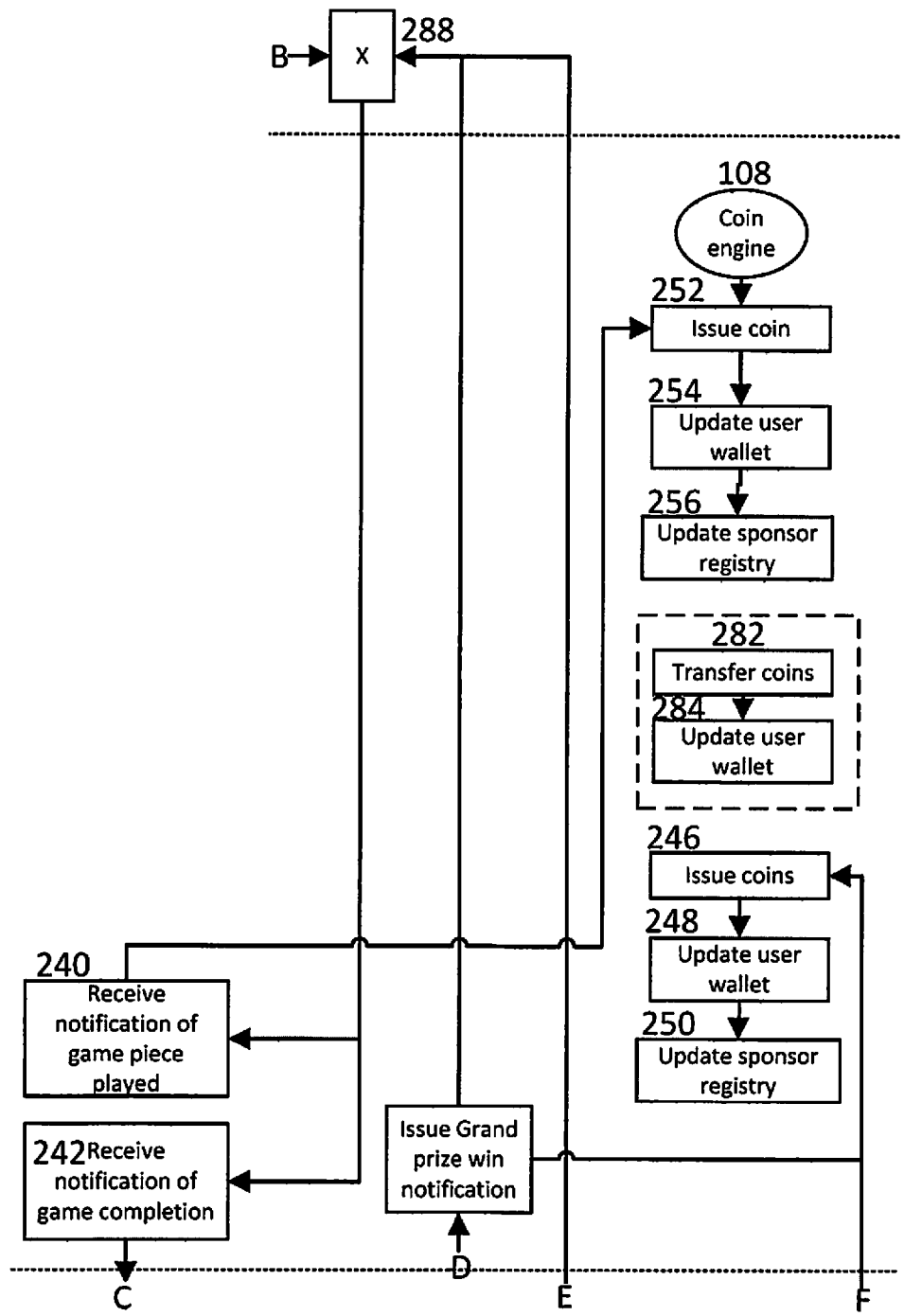
Figure 2D:
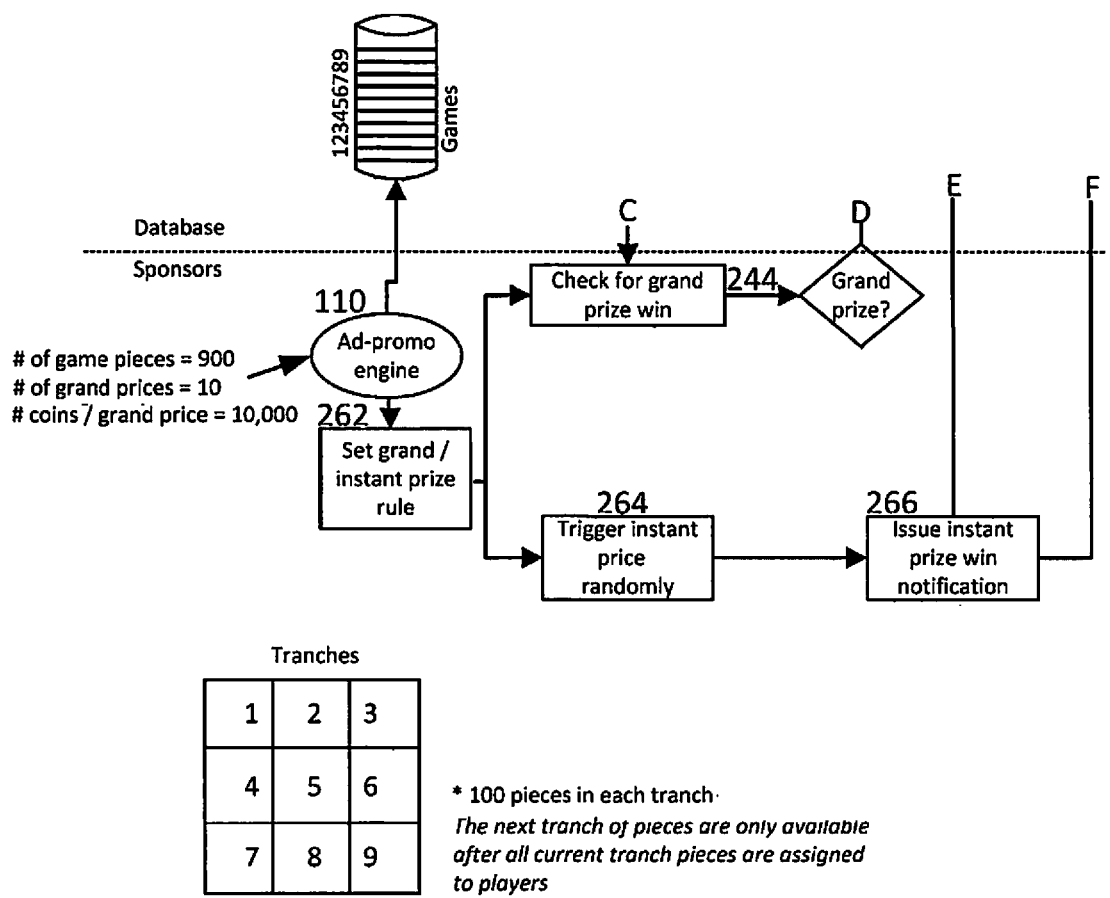

In one embodiment as shown in FIG. 1 of the present invention comprises a consumer digital device 10 or an embedded device comprising: an user interface 12 for a user authentication; a sensor 14 for receiving a signal to record a segment of a security code for a digital currency to store in a register; a manipulator interface 16 for selecting and combining the segments to complete the security code for unlocking the digital currency; and a communication device for transferring the digital currency to a transceiver.

In one embodiment of the present invention, the present invention provides a consumer a digital device for engaging users with multiple brand-related engagements, such as games or other similar activities.

A sponsor may initiate a campaign by engaging a cloud server 18 for carrying out a method 260 comprising the step of setting the main prize and other minor prize or awards in step 262. Then the game engine 106 will receive a request for a game piece from the campaign method. The game engine 106 checks whether a main prize is won in step 244, and checks whether a minor prize is won 264. The minor prize may be selected from random events with a relatively high probability in order to keep the interest of the user. If it is detected a minor prize is won, the game engine 106 will issue a minor prize notification in step 266.

A prize can be unlocked when a user is able to retrieve a security code. The security code is broken up into a number of segments which can be represented a by game piece, but at the back end it is a segment of a security code.

In one embodiment, the present invention can be utilised in a method and system for mobile phone users to engage in multiple promotional campaigns by registering just once. The system enables users to gain rewards that can be cashed in immediately or accumulated. Users participate in promotions through a combination of games of chance and games of skill. The system enables sponsors to register once to conduct multiple promotional campaigns.

In one embodiment of the present invention, the system provides a method for merchants to conduct promotions instantaneously. While there are tools available to run Advertisements on social media, such as Google and Facebook websites instantaneously, there is no such tool or platform to run a sponsorship campaigns that reward users, let alone multiple campaigns.

For a merchant to conduct a sponsorship campaign requires planning and investing in logistics and advertising to offer potential customers the benefits of a promotion. Potential customers need to register multiple times to participate in multiple promotional campaigns. Rewards from the various promotional campaigns end up in disparate systems or locations and are not always easy to convert. In one aspect of the present invention, it addresses this problem by providing a platform that allows multiple sponsors to launch individual promotions. Potential customers gain access to the multiple sponsor campaigns, earn a profit, or accumulate rewards in one place through a single system.

The invention of the present allows consumers to press one button to gain rewards that can be cashed in immediately or accumulated for cashing in at a future date through the system. The invention has improved the process of converting user engagement to coins that can be profited immediately or accumulated for future conversion. The present invention is adapted to allow users to bring multiple promotions into a systematic method. In a further aspect of the present invention, there is provided code based confirmation of a desired user behavior and brand interactions via the use of augmented reality and geolocation technology.

This implementation may be carried out with a process as described in FIG. 2A-D. FIG. 2A-D discloses a process flowchart for a multiple campaigns system 100 for mobile phone users to engage in multiple promotional campaigns by registering just once. The system 100 comprises a multiple campaigns engine or B engine 102, a phrase engine 104, a game engine 106, a (ad-promo) rewards engine 110, and a coin engine 108.

In one preferred embodiment, the consumer digital device 10 will receive a code to trigger the process for the multiple currency system 100. The code can be obtained by scanning a picture of a merchandise, bar code on the packaging, or QR code in a shop, or typing in a code via an interface. The consumer digital device 10 will request whether a game shall be played in step 92 by sending the code to a game server. If affirmative, the control will pass to the game B engine 102. Otherwise, an error message will be generated in step 94.

The multiple campaigns system 100 is adapted to provide a number of games to a user. When the user finishes a game, there may be a reward provided to the user. The multiple campaigns system 100 allows a user to use a consumer digital device 10 or a mobile device to carry out the method of the multiple campaigns system 100. In one preferred embodiment, the consumer digital device 10 will provide the interface for a user to interact, but most of the method of the present invention, such as the method of the game B engine 102, phrase engine 104, game engine 106, coin engine 108, and (ad promo) rewards engine 110, is carried out by a cloud-based server. This is aimed at preventing users from cheating in the game.

When the consumer digital device 10 starts the game, the consumer digital device 10 may send a request to obtain a game piece. Typically, the consumer digital device will receive a game piece randomly between 2-5 tries.

In one embodiment, the multiple campaigns system 100 comprises a phrase engine 102 adapted to carry a tracking method 210 of tracking the phrase location. The phrase tracking method 210 comprises steps of: checking the user phrase location in step 212; requesting user next set of phrases 214; incrementing the user phrase location in step 216; and serving next set of phrases 218.

Figure 3:
FIG. 3 shows a welcome interface of the method of FIG. 2.

When a user starts the software application for the multiple campaigns system 100, the consumer digital device 10 will display a welcome screen as shown in FIG. 3.

Figure 4:
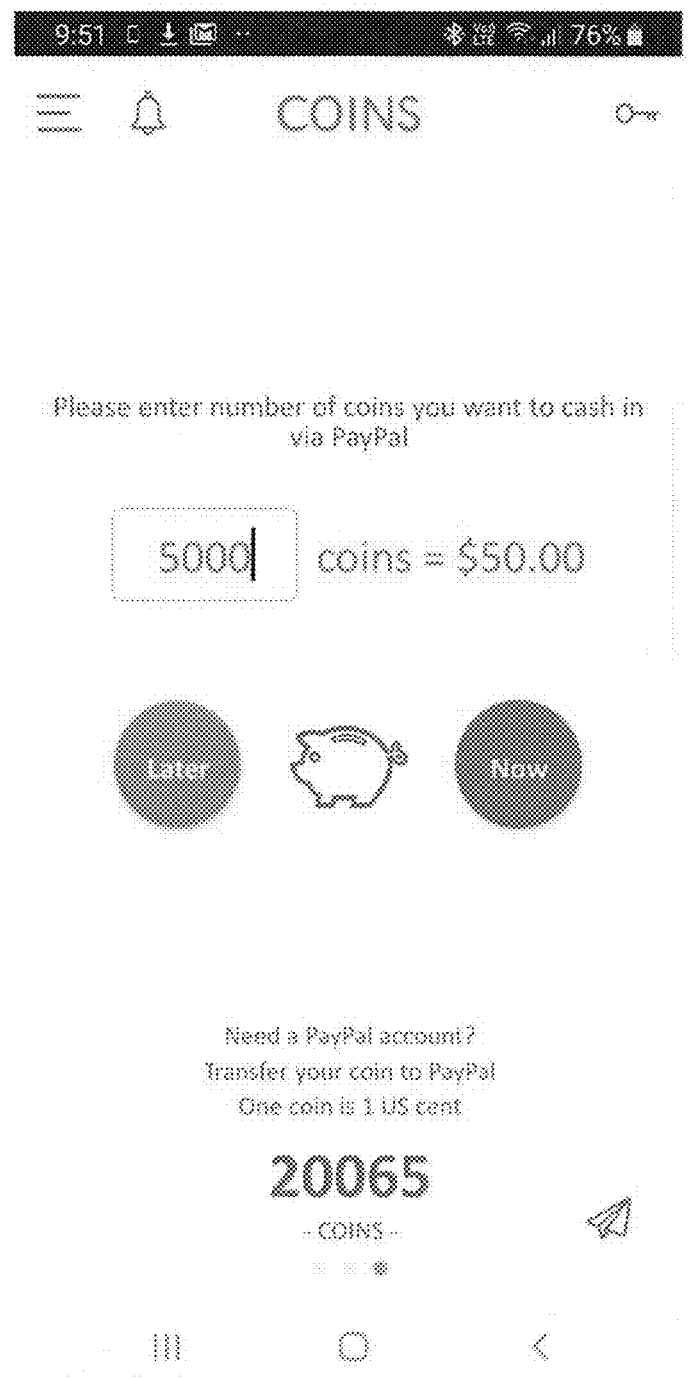
FIG. 4 shows a game listing interface of the method of FIG. 2.

In preparing the game, the multiple campaigns engine 102 is adapted to carry out a game sponsored by method 220 comprising the steps of: checking for a game piece in step 222; identifying a particular game and determining a valid piece in step 224. The consumer digital device 10 may display the selection interface as shown in FIG. 4. A user may select which game to play. Once the user makes a selection, the multiple campaigns engine 102 will proceed to determine whether any game piece is available in step 226.

In the event that there is a game piece available, request a game piece in step 228, or else move to the next game 230 and return to step 224.

Figure 5:
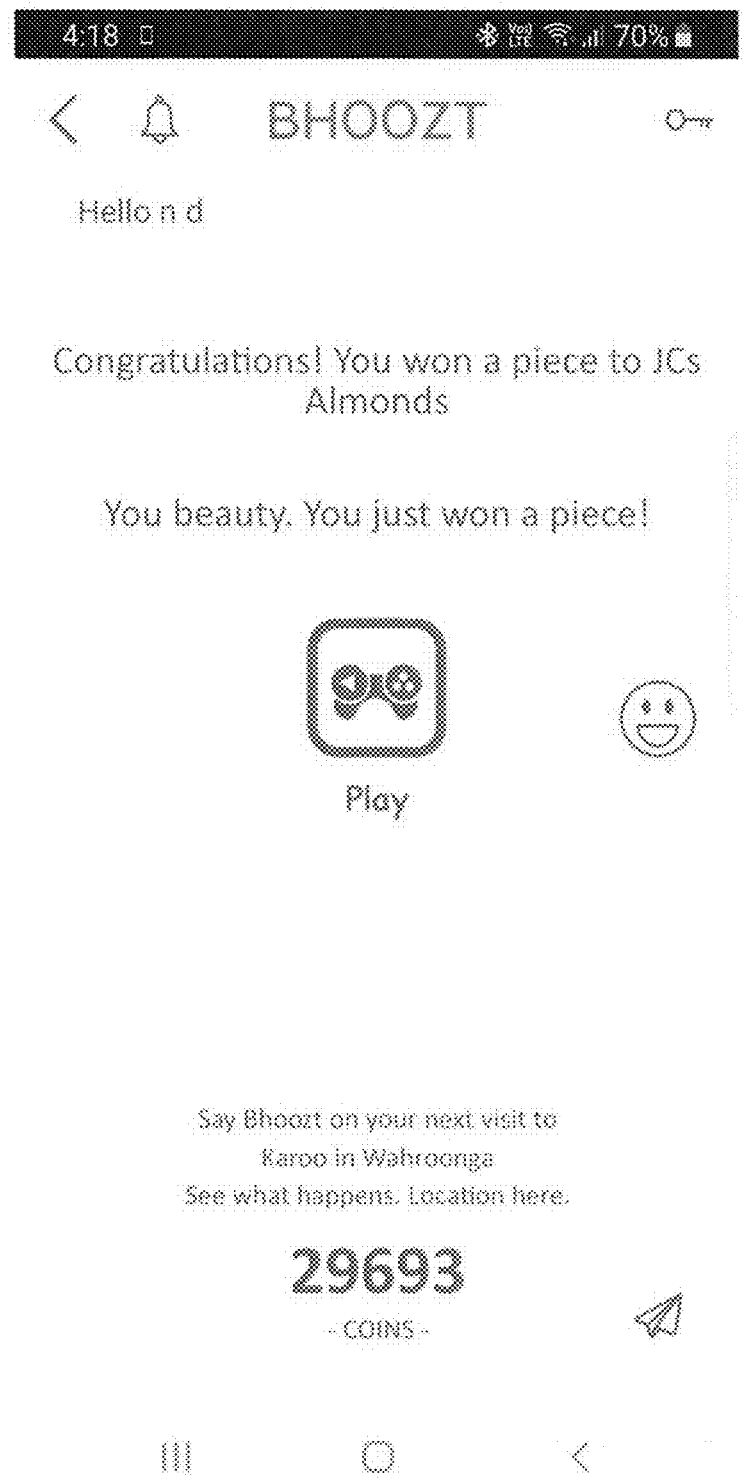
FIG. 5 shows a scanning interface of the method of FIG. 2.
Figure 6:
FIG. 6 shows another scanning interface of the method of FIG. 2.

After requesting a game piece in step 228 the game server, which is a cloud server in one embodiment, will issue a new game piece in step 232 in response. In one embodiment, the consumer digital device 10 comprises an RGB, a bar code scanner, a NFC scanner, or an infrared sensor for sensor an object or image. In another embodiment the code may be obtained from another application. The consumer digital device 10 may scan an object, or bar code with the scanning interface as shown in FIG. 5 and FIG. 6. The new game piece will be issued in step 232 in accordance with the image or bar code scanned.

With the new game piece issued in step 232, the game engine 106 carries out a game pieces collection method comprising the steps of: incrementing a memory register for a prize in step 234, and blocking the game piece 236.

Figure 7:
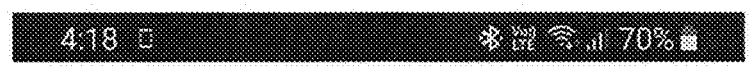
FIG. 7 shows a game play interface of the method of FIG. 2.
Figure 8:
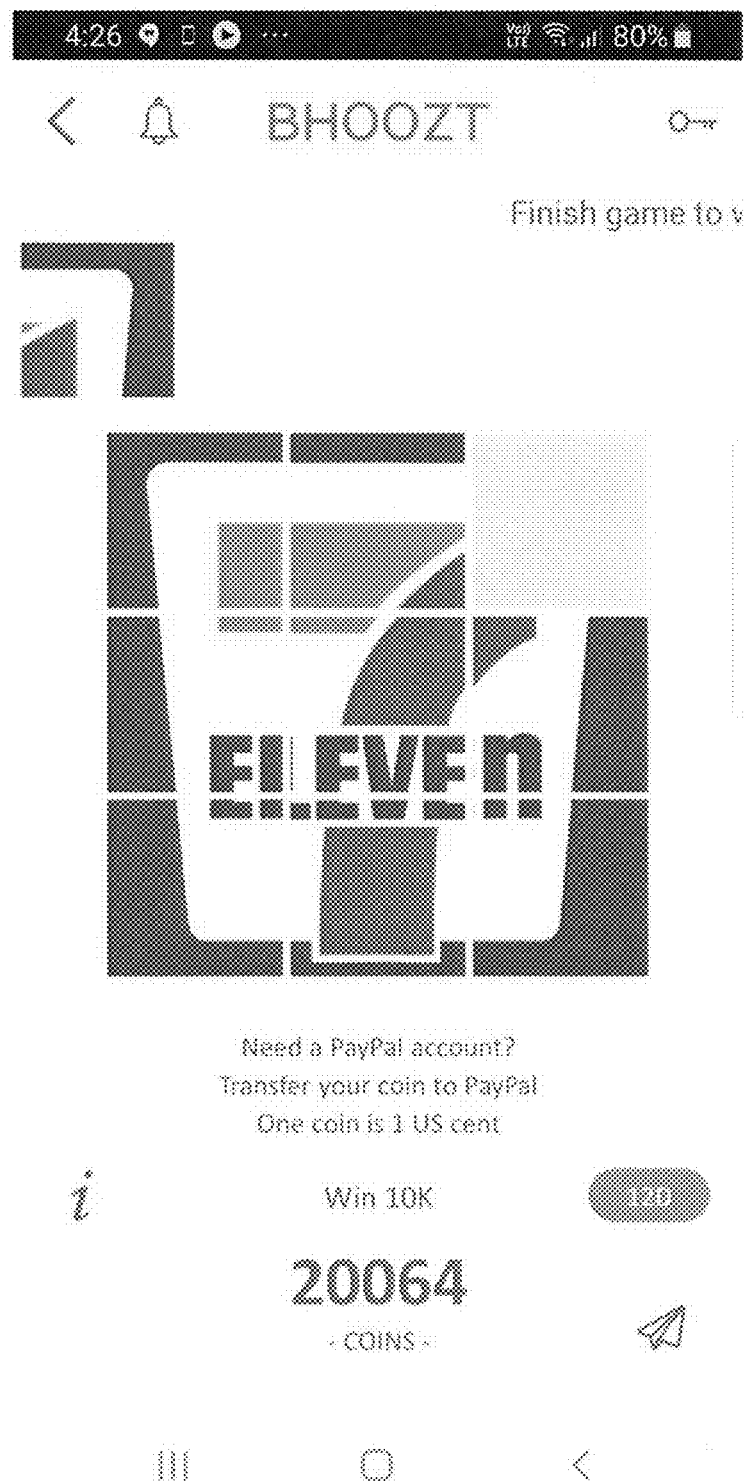
FIG. 8 shows another game play interface of the method of FIG. 2.

The user may then select to start playing the game in step 238 with the interface as shown in FIG. 7 and FIG. 8. When a user plays the game, an event signal will be sent back to the cloud server to determine whether the user won a prize.

After a game piece is played, the game engine 106 will carry out steps of: sending a notification of the game piece played in step 240, or sending a notification of the game completed in step 242.

When the game is completed, the (ad-promo) rewards engine 110 is adapted to carry out a prize determination method for determining a prize of the game. The prize determination method comprises the steps of checking if a prize is won in step 244, end the process if a prize is not won. If the prize is won, the (ad promo) rewards engine 106 will issue a prize notification 245 to a user, and allow the user to play a new game in step 238.

When the coin engine 108 is adapted to carrying multiple campaigns in response to a notification of (ad-promo) rewards engine. The multiple campaigns management method comprises the steps of: receiving a notification of winning a prize in step 240 or 245, it will issue a reward step 246, update an account of the user with the reward in step

Figure 9:
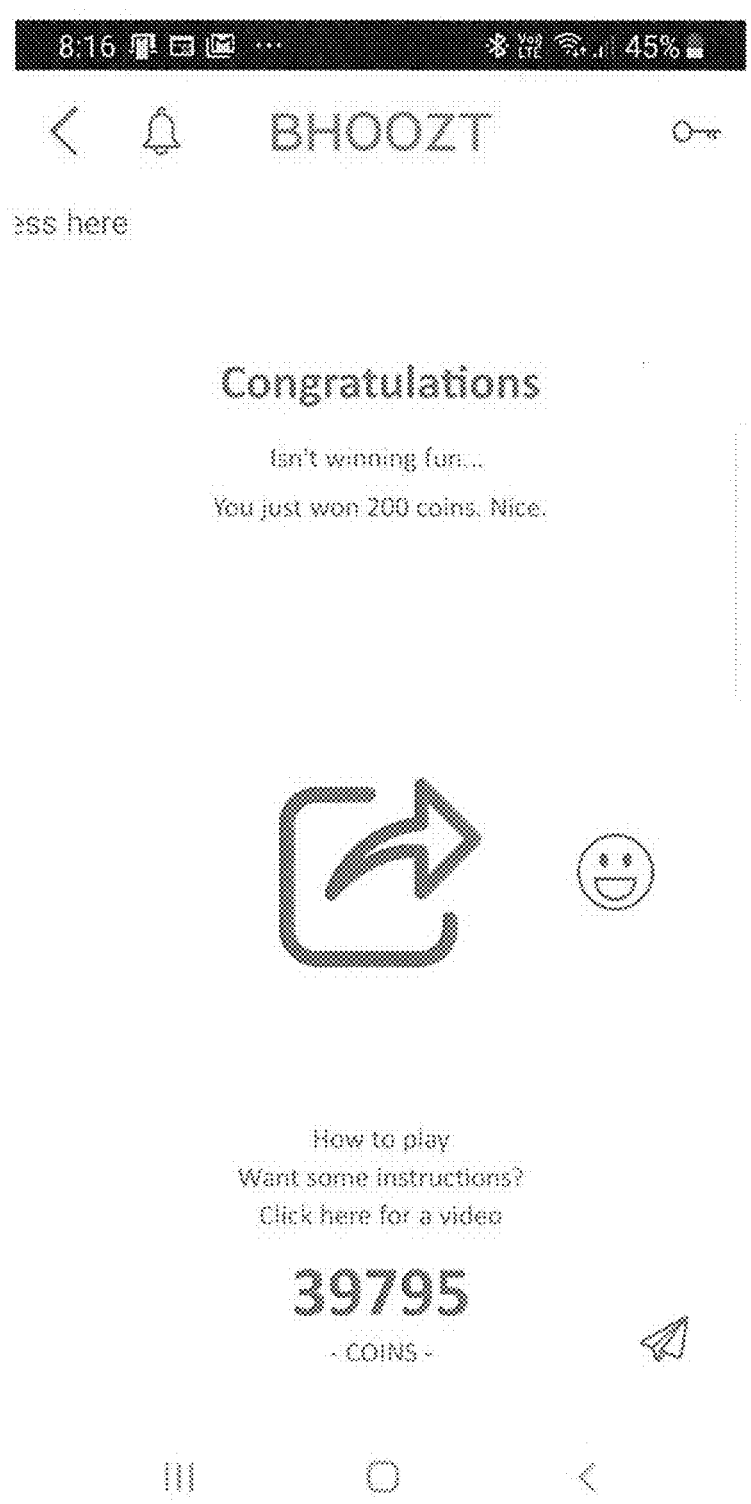
FIG. 9 shows a winner interface of the method of FIG. 2.
Figure 10:
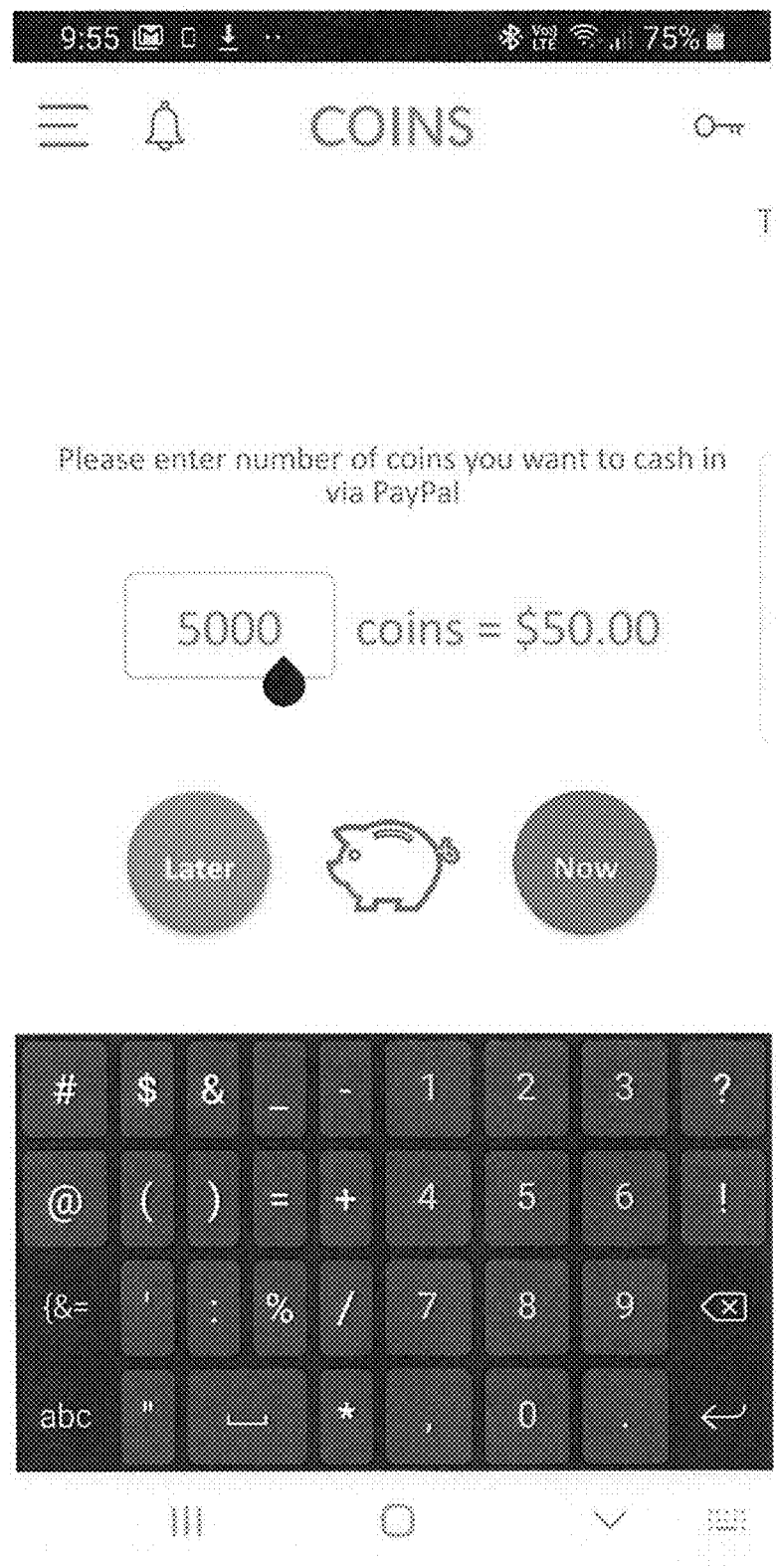
FIG. 10 shows another winner interface of the method of FIG. 2.
Figure 11:
FIG. 11 shows a try again interface of the method of FIG. 2.
Figure 13:
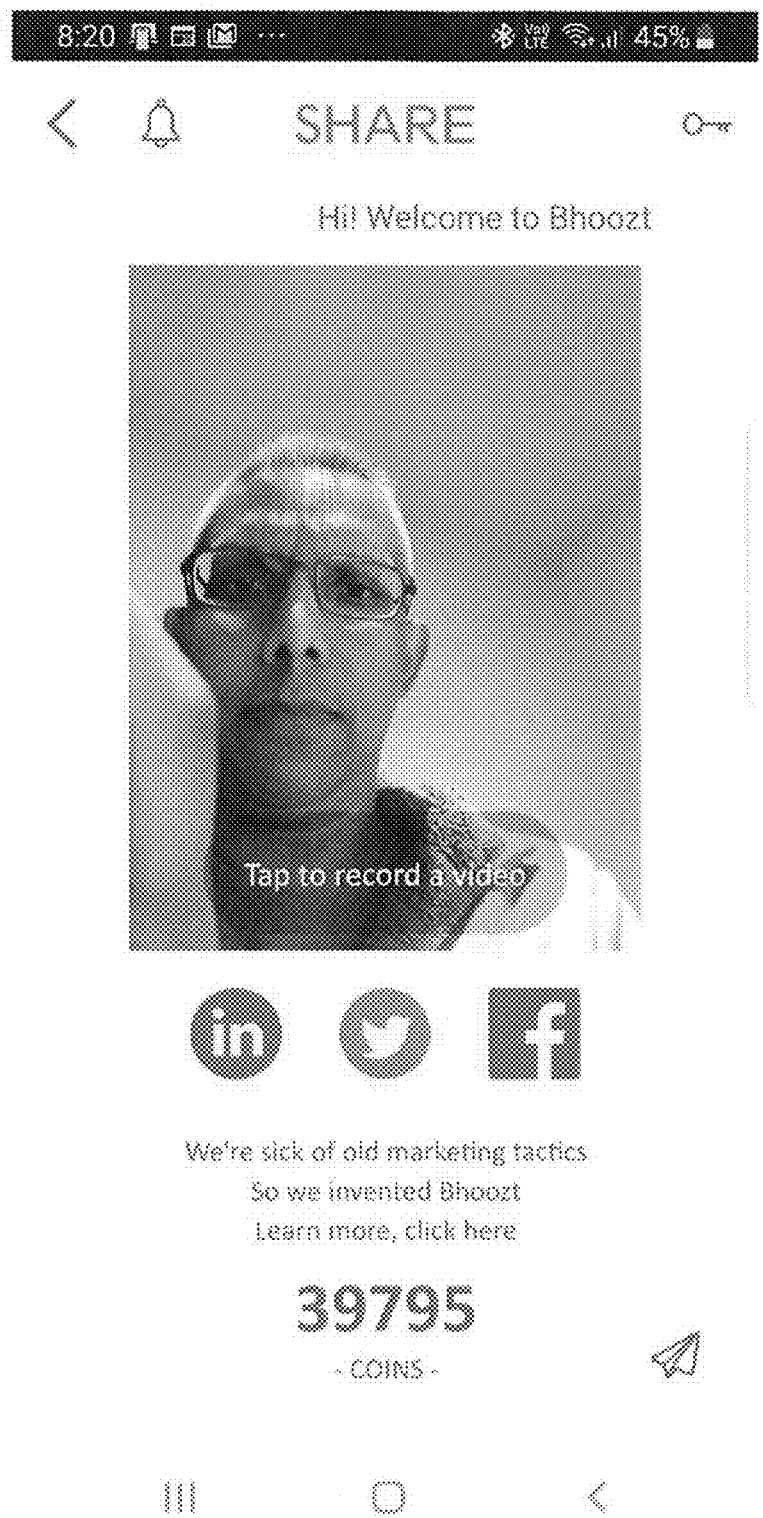
FIG. 13 shows a sharing interface of the method of FIG. 2.
Figure 15:
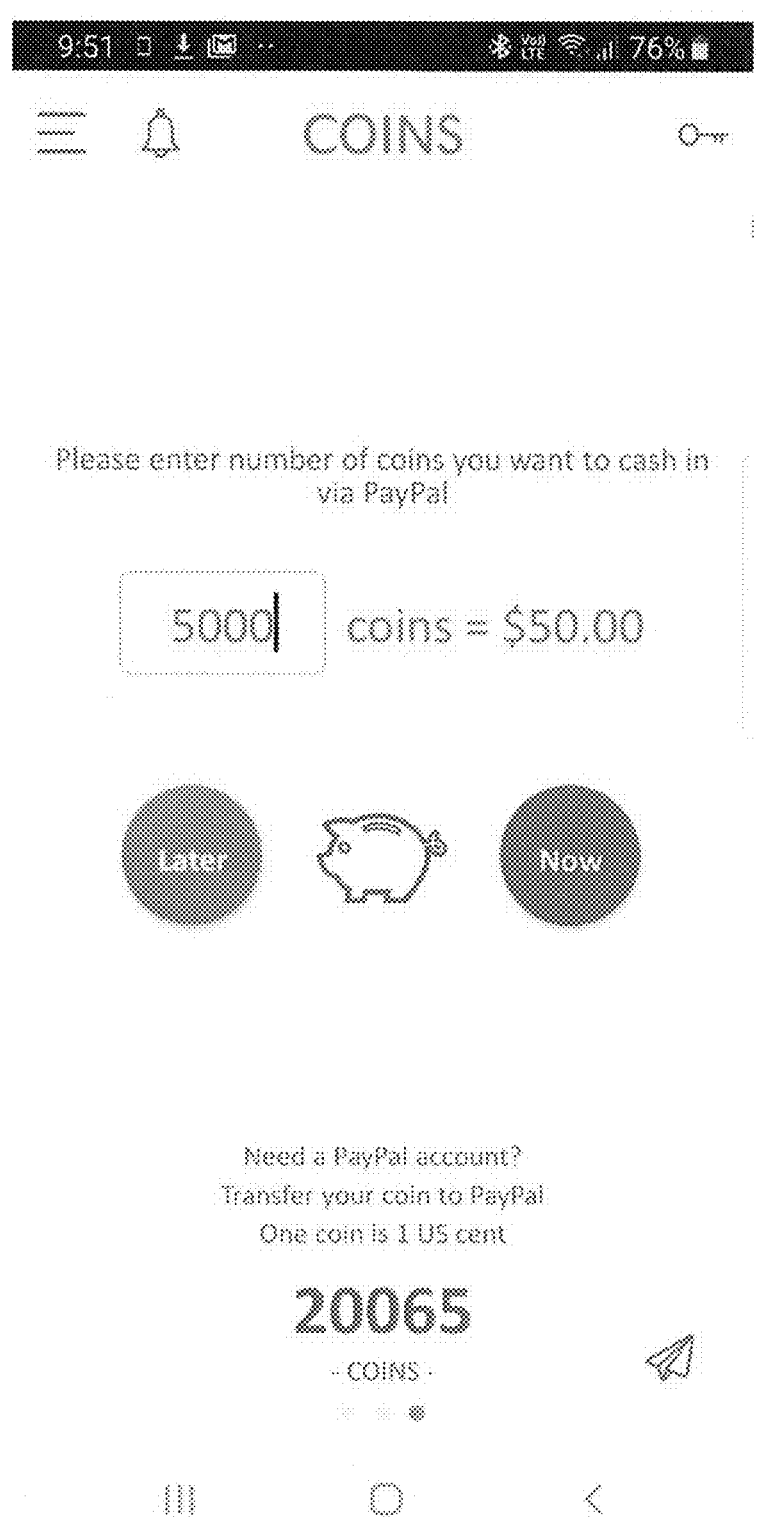
FIG. 15 shows a currency exchange interface of the method of FIG. 2.

248; and update a registry of the sponsor in step 250. At the same time when a winner is detected, the consumer digital device 10 will display a winning notification to the user as shown in FIG. 9 and then show the amount won as shown in FIG. 10. Otherwise, the consumer digital device 10 will display an interface as shown in FIG. 11 to nudge the user to try again. This can nudge the user to engage in more campaigns. The user may also share his/her result with the sharing interface as shown in FIG. 13. In one embodiment, the multiple campaigns system 10 is also adapted to provide an interface for a user to exchange different kinds of currencies as shown in FIG. 15.

When a user has played a game piece in step 238, the multiple campaigns system 10 may provide the user with a minor reward, the awarding method comprises of steps: issuing a reward step 252; updating an account of the user with the reward in step 254; and updating a registry of the sponsor in step 256.

The reward methods comprise the steps of: issuing a reward step 246, 252; updating an account of the user with the reward in step 248, 254; and updating a registry of the sponsor in step 250 256.

Figure 12:
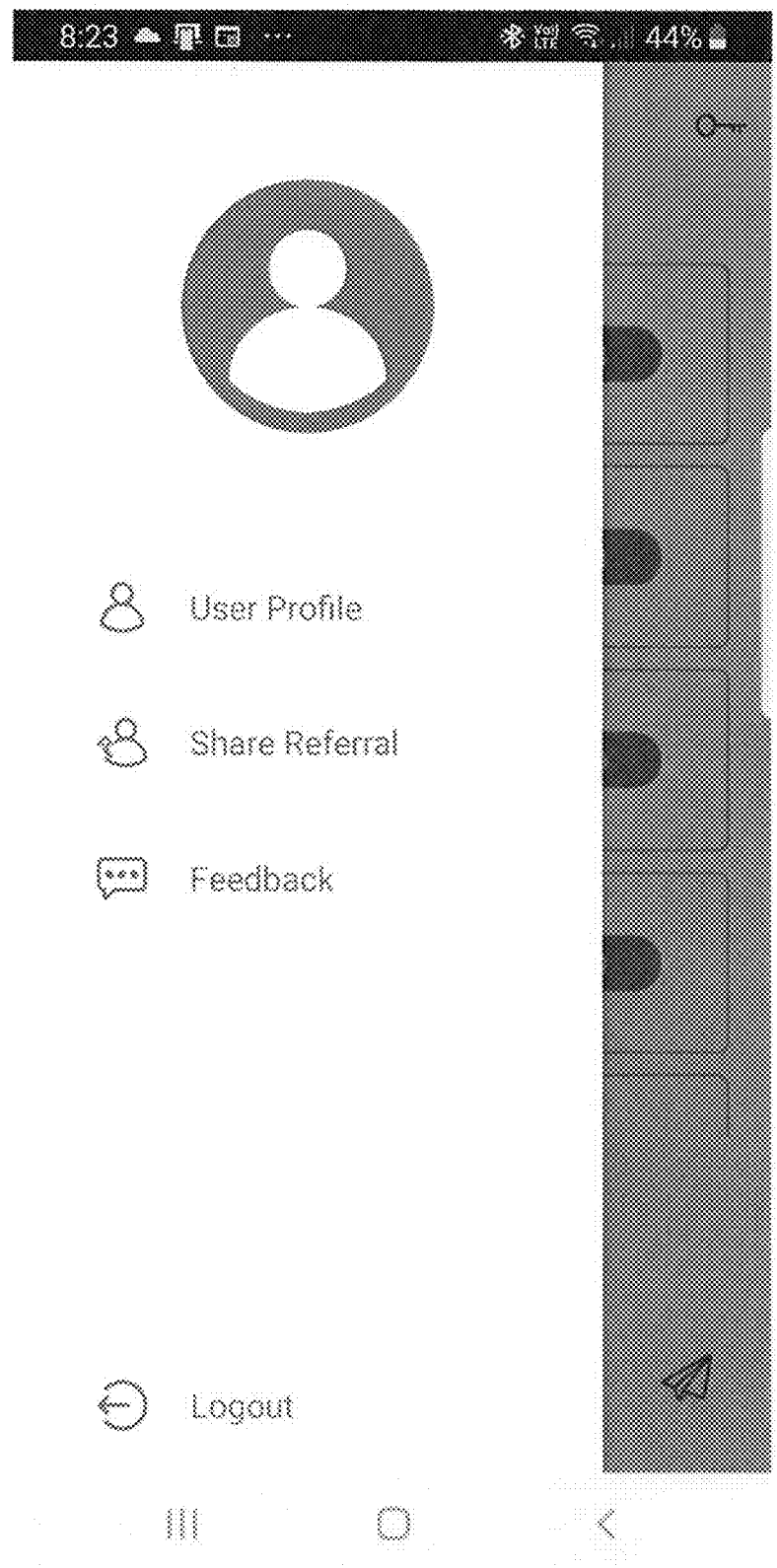
FIG. 12 shows a control setting interface of the method of FIG. 2.

A user may control the multiple campaigns system 10 with the control setting interface as shown in FIG. 12. Through the control setting interface, the user may choose to see a sponsor campaign, enter a code, view a result, view a prize, and view game related information.

The multiple campaigns system 10 comprises a (ad-promo) rewards engine 106 for a sponsor to control an advertisement or promotion campaign method 260. The sponsorship campaign method 260 comprises the step of setting the main prize and other minor prize or rewards in step 262. Then the (ad promo) reward engine 106 will receive a request for a game piece from the campaign engine method. The rewards engine 106 checks whether a major prize is won in step 244, and checks whether a minor prize is won 264. If it is detected that a minor prize is won, the rewards engine 106 will issue a minor prize notification in step 266.

In one embodiment, the multiple campaigns system 10 is adapted to allow a sponsor to view and control the budget of a sponsorship campaign as shown in FIG. 14.

The benefit of the present invention is to allow the consumer digital device to interact with a real world object for collecting segments of a security code. The digital device may need to scan a number of different objects in order to collect sufficient segments of a security code. A segment of code may be embedded in a matrix barcode on a product, an image, etc.

In one embodiment, the consumer digital device scans an image of a product, a matrix barcode, or a convertible note, and then generates a digital signature. The digital signature is sent to a server for verification and authentication. The server will then generate a random segment of the security code and send it back to the consumer device. The consumer device then stores the segment of the security code in a registry.

In one embodiment, a complete security code may consist of a predefined number of segments (e.g. nine). The consumer digital device will receive random segments of code when scanning different items. Sometime, the consumer digital device will receive a duplicate segment of the security. To unlock a digital currency, the consumer digital device will present a manipulator interface to allow the assembling of the random segment of the security code. The consumer digital device may provide different clues or hints to assist the assembling process. For example, the manipulator interface may present the random segments of the security code as jigsaw puzzle pieces. In order to assemble the random segments of code into a complete security code, a user will need to assemble the jigsaw puzzle. Although, the consumer digital device has a manipulator interface to allow the user to solve a jigsaw puzzle, in effect the user is rearranging the segment of the security code into a correct permutation.

Once the segments of the security code are rearranged into a correct permutation, the security code can be used to decrypt a digital currency. The digital currency can be any digital certificate with monetary value. It can be a cryptocurrency, bank money, debt instrument, promotion code, letter of credit, bill of lading, voucher, coupon, vehicle or vessel registration, land title, etc.

In one embodiment of the present invention, the consumer digital device may have multiple streams of registers for storing segments of security code for different currencies. For example, one stream of register is adapted to store meal vouchers, one other stream for shop coupons, one for US dollars, one for bitcoin, and another for land titles. The segments solving a security code for one currency may not be used for solving a security code for a different currency. However, in another embodiment, segments solving a security code for one currency may be used for solving a security code for a different currency.

In one scenario, different merchants can issue their own currency to use in their shop only. In another situation, a group of different merchants may join together to issue a common digital currency for consumption in the group.

In one embodiment, the consumer digital device provides a currency exchange interface for trading different segments of a security code. In one implementation, a consumer digital device may trade a segment of a security code for a currency with another consumer digital device for another segment of the security code for the same currency. The cost of trading can be negotiated between the two devices. In one example, a device may trade five segments of security code for a coffee voucher for one segment of security code for a restaurant discount coupon. In another embodiment, the consumer digital device allows the exchange of different segments of code with another device.

It is possible for a user to register one and participate in the collection of different currency for use in the shop of different merchants.

In one embodiment, the number of segments for a security code for a currency is directly proportional to the value of the currency to be unlocked. For example, the consumer digital device may require two segments to unlock a meal voucher for a fast food shop, but needs to collect twenty segments for land title.

In one embodiment, each segment is associated with a frequency of issue or issue probability. Some segments may have a high probability of issue and hence it is easier to collect. Some segments may have a very low probability of issue and make it extremely difficult to collect. For example, one of the segment to unlock a security key for a land title may have an issue probability of 1/1,000,000.

Further, the re-arrangement of the segments may be difficult such that it will take more time for a user to assemble the security code. For example, instead of a two-dimension puzzle, the segments of code are present as pieces of a three-dimension interlocking puzzle.

In one embodiment, the actual segments of the security code is not stored in the consumer digital device. The manipulation interface allows a user to solve a difficult problem, e.g. dimensional puzzle (jigsaw, packing problem, interlocking problem, etc). In effect, the manipulation interface is adapted to provide visual clues for a user to derive a correct permutation of the segments of the security code. Once a user is settled with a solution, the permutation will be encrypted and signed digitally, and forwarded to the server. The server will extract the permutation and rearrange the segments stored in the server database. The resulting code will be used for deciphering a digital currency. The cipher will not work if the user failed to provide a correct permutation. Hacking the consumer digital device will not produce any sensible solution as all the segments are stored in the server.

The re-arrangement of the segments of the security code can be complex when applying with a multiple dimension puzzle operation. In one embodiment, the movement of a segment can be represented by a movement of a game piece. In one embodiment, the game piece is a three-dimension interlocking puzzle. The game piece is allowed to move upward, downward, forward, backward, left, and right. These movements can be encoded as increment, decrement, multiply, divide, left shift, and right shift. The number of step move can be used to denote the value of the operation.

The present invention provides an improvement on both the promotions and advertising processes. Promotions currently are a 10-20 week process but with the present invention, it can turn into days. Also, there is no such promotions platform exactly the same as the present invention in the current market.

Advertising is designed to interrupt, demand attention, ask the consumer to act towards an alleged future benefit. The present invention provides a process that offers tangible value upfront and then makes the target audience interact with the advertisement to build the Advertisements.

Another object of the invention is to offer consumers a benefit now for free to create a positive frame of mind and then encourage a desired behaviour in a highly measurable manner. The overall outcome is aimed at improving the consumer experience.

It is an object for the present invention to provide merchants access to a pool of value with consumers who are likely to have a high propensity to spend due to the fact that they received the value for free to begin with.

This is an improvement to the current economic environment that merchants operate in.

The invention of the present invention will also be capable of running invitation-only engagements (invitation via a code). Additional tools may also be provided in an embodiment of the present invention to amplify campaigns, such as inviting and connecting with friends and encouraging users to Pay It Forward (PIF), creating a new PIF platform that codifies and scales the Pay It Forward concept.

In one embodiment, there is provided a cloud-based software platform that empowers companies to run sponsor campaigns via a mobile app. The software platform can:

1. Empower a sponsor to run a campaign in minutes at any budget. Enables invitation only engagements easily.

2. Make it simple, fun and rewarding to consumers, who sign up once upon installing the app after which any win can be cashed in immediately. They can engage in multiple campaigns from various sponsors in a simple and fun manner, all the while accumulating real value.

3. Engage consumers with the brand numerous times in a fun and rewarding manner tied to real value. This makes the experience positive for the audience while achieving increased brand value to the sponsor.

4. Provide Merchants with real time feedback on success measures and can run new campaigns in an instant. The process is easily repeatable and simple for both sponsors and the sponsored audience.

5. Offer a unique and new way to overcome the constraints and noise with traditional marketing alternatives. Sponsors can add this new mechanism into their marketing mix and compare success against other traditional methods quickly and easily.

In one embodiment of the present invention, consumer digital device 10 allows sponsors looking to run cost effective campaigns. The consumer digital device 10 can be implemented for the following industries, including and not limited to: fast moving consumer good (FMCG) industries; Travel and accommodation industries; Event management industry; Banking industry; Automobile industry; Retailing and Grocery industry; and Pharmaceutical industry.

In one process of the present invention, there is provide an interface for the sponsor to make decision for sales promotion.

In the prior art system, there is only provided a method for making 'customer rewards' available as 'pay-backs' where the customer has to first buy or pay for something in order to get something back, such as a discount, points, etc. The present invention provides a 'pay it forward' platform where the user gets real value up front first.

The present invention provides a device for multiple campaigns system 10 to share the media budget with the audience, which no other platform does. The device of an embodiment of the present invention make it possible for companies to 'sponsor' a large number of individuals (everyone who plays their game) quickly and efficiently In one embodiment, the device of the preset invention is adapted to offer a process to share advertising spend with the audience. For example, every sponsor may provide a value of $1.50 per user that can come and play their game. So a sponsor who pays $1500 will get to reach up to 1000 users. Now every user who comes in and starts playing a game, earns 1 cent every time that user plays a piece. In addition to that if the user is the first to finish the game, the user will win 500 coin which is $5.

The present invention also allows the server or operator to hand out a few instant prizes of 100 coin to a certain number of users. So multiple sponsors are allowed to share the advertising and promotions budget with users who are the audience of the sponsors through a systematic and repeatable process.

It is understood that those persons skilled in the art that variations may be made in the core teachings of this invention.

Although the invention has been described with reference to specific examples, it will be appreciated by those skilled in the art that the invention may be embodied in many other forms, in keeping with the broad principles and the spirit of the invention described herein.

The present invention and the described embodiments specifically include the best method known to the applicant of performing the invention. The present invention and the described preferred embodiments specifically include at least one feature that is industrially applicable.

The invention claimed is:

1. A multiple campaign system to provide one or more gaming engagements to a user to engage with, and obtain a reward from, one or more sponsor promotional campaigns associated with the one or more gaming engagements, said system comprising:

an ad-promo engine in communication with a network and including software providing a selection interface displaying fields to select or customize parameters of each sponsor promotional campaign, the parameters including a budget, at least one reward, and a phrase associated with the at least one reward, the parameters being stored in a sponsor registry;

a game engine in communication with the network and including software arranged to create a game by breaking the phrase into multiple game pieces, match the game created to a sponsor promotional campaign, store the game in a game database, receive a request from a user for the game and for a game piece, check availability of a game piece for the game and for the user; and, if an available game piece remains, select and serve the available game piece to the user; and track progress to determine whether the user has earned the at least one reward;

software arranged to run on a consumer digital device in communication with the network, the software providing a selection interface displaying fields to authenticate the user; request the game and the game piece; receive, arrange, and display game pieces received; determine whether the arranged game pieces are arranged such that they match the phrase; and receive the at least one reward into a wallet associated with an account of the user; and display the wallet of the consumer digital device; and a coin engine in communication with the network and including software to issue the at least one reward to the user based upon the progress, and update the user wallet and the sponsor registry.

2. The multiple campaign system of claim 1, wherein the consumer digital device may send the request to obtain the game piece randomly between 2-5 tries.

3. The multiple campaign system of claim 1, wherein the consumer digital device is adapted to display the selection interface to allow a user to select which sponsor promotional campaign to engage in.

4. The multiple campaign system of claim 3, wherein the selection interface is adapted to request the game engine to proceed to determine whether a game piece is available once the user makes a selection on the selection interface.

5. The multiple campaign system of claim 4, wherein the consumer digital device is adapted to select another game in the event the game piece is not available.

6. The multiple campaign system of claim 5, wherein the game engine is adapted to issue a new game piece in response to a game piece request from the consumer digital device.

7. The multiple campaign system of claim 6, further comprising the game engine including a game pieces collection method of comprising incrementing a memory register for a major prize and blocking re-issue of a same game piece.

8. The multiple campaign system of claim 7, wherein the game engine is adapted to send a notification of the game piece played, or send a notification of the game completed.

9. The multiple campaign system of claim 8, further comprising the coin engine including a prize determination method comprising checking if a prize is not won, end the process; and if the prize is won, issue a prize notification to a user.

10. The multiple campaign system of claim 9, further comprising a multiple campaign management method comprising receiving a notification of winning the prize, issuing the prize, updating an account of the user with the prize; and updating the sponsor registry.

\* \* \* \* \*